United States Patent
Kim (10) Patent No.: US 11,411,268 B2
(45) Date of Patent: Aug. 9, 2022

(54) COOLANT SUPPLYING MODULE

(71) Applicants: Hyundai Motor Company, Seoul (KR); Kia Motors Corporation, Seoul (KR)

(72) Inventor: Yeon Ho Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 238 days.

(21) Appl. No.: 16/857,915

(22) Filed: Apr. 24, 2020

(65) Prior Publication Data

US 2021/0218088 A1 Jul. 15, 2021

(30) Foreign Application Priority Data

Jan. 15, 2020 (KR) ........................ 10-2020-0005151

(51) Int. Cl.
*H01M 10/6568* (2014.01)
*H01M 10/613* (2014.01)

(52) U.S. Cl.
CPC ..... *H01M 10/6568* (2015.04); *H01M 10/613* (2015.04)

(58) Field of Classification Search
CPC ............ H01M 10/613; H01M 10/625; H01M 10/6568; B60K 1/00; B60K 2001/005; B60K 2001/006; B60K 11/04; F01P 3/12; F01P 5/10; F01P 7/14; F01P 7/165; F01P 11/029; F01P 2005/105; F01P 2007/146; F01P 2050/24; Y02E 60/10; B60L 58/26
USPC ....................................................... 165/80.4
See application file for complete search history.

(56) References Cited

U.S. PATENT DOCUMENTS

| | | | | |
|---|---|---|---|---|
| 6,094,930 A * | 8/2000 | Zeng | ........................ | F25B 13/00 62/509 |
| 6,564,757 B2 * | 5/2003 | Suzuki | ....................... | F01P 7/16 123/41.14 |
| 8,839,894 B2 * | 9/2014 | Yokoyama | ............... | B60K 1/00 180/299 |
| 9,016,415 B2 * | 4/2015 | Kobayashi | ................ | B60L 3/00 123/41.27 |
| 9,522,609 B2 * | 12/2016 | Lee | .................... | H01M 8/04007 |
| 10,106,027 B1 * | 10/2018 | Keller | ....................... | B60K 1/02 |

(Continued)

FOREIGN PATENT DOCUMENTS

KR 10-2019-0019178 A 2/2019

*Primary Examiner* — Len Tran
*Assistant Examiner* — Gustavo A Hincapie Serna
(74) *Attorney, Agent, or Firm* — Morgan, Lewis & Bockius LLP (57) ABSTRACT

A coolant supplying module of supplying a coolant stored in a reservoir tank to an electrical component cooling circuit and a battery cooling circuit may include a main body connected to the shared reservoir tank, at least one water pump mounting portion formed at the main body to mount at least one water pump provided in the electrical component cooling circuit and the battery cooling circuit, and a valve mounting portion formed at the main body such that a coolant valve for changing flow path of the coolant circulating through the electrical component cooling circuit and the battery cooling circuit is mounted, wherein a main connecting portion and a sub connection portion are respectively formed on the main body to be connected to the shared reservoir tank.

15 Claims, 5 Drawing Sheets

(56) References Cited

U.S. PATENT DOCUMENTS

| | | | | |
|---|---|---|---|---|
| 11,111,839 B2* | 9/2021 | Ayva | ............... | F01P 7/14 |
| 2007/0044938 A1* | 3/2007 | Farley | ............... | B60K 11/02 |
| | | | | 165/41 |
| 2009/0133858 A1* | 5/2009 | Kumlin | ............... | G06F 1/20 |
| | | | | 165/108 |
| 2009/0151903 A1* | 6/2009 | Na | ............... | B60K 11/02 |
| | | | | 165/104.19 |
| 2011/0284107 A1* | 11/2011 | Ciak | ............... | F01P 11/029 |
| | | | | 137/563 |
| 2012/0168118 A1* | 7/2012 | Myers | ............... | F01P 11/08 |
| | | | | 165/51 |
| 2012/0183815 A1* | 7/2012 | Johnston | ............... | B60L 58/27 |
| | | | | 429/50 |
| 2015/0345368 A1* | 12/2015 | Le Poul | ............... | B65D 51/1644 |
| | | | | 123/41.51 |
| 2017/0373359 A1* | 12/2017 | Krull | ............... | B60K 11/02 |
| 2018/0316035 A1* | 11/2018 | Song | ............... | H01M 8/0202 |
| 2019/0170053 A1* | 6/2019 | Mark | ............... | F01P 7/165 |
| 2020/0009939 A1* | 1/2020 | Potticary | ............... | F01P 11/029 |
| 2020/0328652 A1* | 10/2020 | Miki | ............... | F16H 57/0412 |
| 2020/0408134 A1* | 12/2020 | Asano | ............... | F01P 11/029 |
| 2022/0153139 A1* | 5/2022 | Singhal | ............... | B60L 58/26 |

* cited by examiner

COOLANT SUPPLYING MODULE

CROSS-REFERENCE TO RELATED APPLICATION

The present application claims priority to Korean Patent Application No. 10-2020-0005151 filed on Jan. 15, 2020, the entire contents of which is incorporated herein for all purposes by this reference.

BACKGROUND OF THE INVENTION

Field of the Invention

The present invention relates to a coolant supplying module. More particularly, the present invention relates to a coolant supply module capable of smoothly supplying coolant to electrical equipment and a battery module, and to install various components including a chiller.

Description of Related Art

Nowadays, while interest in energy efficiency and an environment pollution problem increases, development of an environment-friendly vehicle that can substantially replace an internal combustion engine vehicle is requested. The environment-friendly vehicle is classified into an electric vehicle which is driven using a fuel cell or electricity as a power source and a hybrid vehicle which is driven using an engine and an electric battery.

Here, an electric vehicle that utilizes a fuel cell converts chemical reaction energy of oxygen and hydrogen to electrical energy to occur a driving torque, and in the present process, thermal energy occurs by a chemical reaction within the fuel cell and it is essential in securing a performance of the fuel cell to effectively remove a generated heat.

Furthermore, a hybrid vehicle generates a driving torque by driving a motor using electricity which is supplied from an electric battery or the fuel cell together with an engine operating with general fuel, and when effectively removing a heat occurring in a fuel cell, a battery, and a motor, a performance of the motor may be secured.

Such a hybrid vehicle is driven in an EV mode which is driven by a motor upon constant speed driving, gentle driving, and low and medium constant speed driving, upon acceleration and rapid acceleration, an internal combustion engine and a motor are simultaneously driven, and upon high constant speed driving, a motor is stopped and the hybrid vehicle is operated by the internal combustion engine.

Accordingly, in a hybrid vehicle, an engine cooling means for circulating and cooling coolant in an engine and an electrical equipment cooling means for circulating and cooling coolant in an electric power component including a motor are each provided.

However, in such a conventional hybrid vehicle, as an engine cooling circuit and an electronics cooling circuit are each configured with a separate close and seal circuit. Accordingly, as two reservoir tanks used to each cooling circuit may be provided, they are difficult to be mounted in a narrow engine compartment, and a manufacturing cost is increased due to the increasing of the constituent elements.

Also, the weight is increased due to the increasing of the constituent elements and productivity may deteriorate by the increasing of a mounting time of each reservoir tank.

The information disclosed in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a coolant supplying module having advantages of supplying a coolant from a shared reservoir tank to both an electrical component cooling circuit and a battery cooling circuit.

An exemplary coolant supplying module is for supplying a coolant stored in a reservoir tank to an electrical component cooling circuit and a battery cooling circuit, and includes a main body connected to the shared reservoir tank, at least one water pump mounting portion formed at the main body to mount at least one water pump provided in the electrical component cooling circuit and the battery cooling circuit, and a valve mounting portion formed at the main body such that a coolant valve for changing flow path of the coolant circulating through the electrical component cooling circuit and the battery cooling circuit is mounted, wherein a main connecting portion and a sub connection portion are respectively formed on the main body to be connected to the shared reservoir tank.

A main discharge port and a sub discharge port may be formed at the bottom portion of the shared reservoir tank, respectively, in corresponding to the main connecting portion and the sub connecting portion.

The at least one water pump mounting portion may include a first water pump mounting portion mounting a first water pump included in the electrical component cooling circuit, and formed at one side of the main body, and a second water pump mounting portion mounting a second water pump included the battery cooling circuit, and formed at the other side of the main body.

The first water pump mounting portion and the second water pump mounting portion may be disposed to face each other on both sides of the main body, and may be positioned on the same line.

The main connecting portion may be formed on the main body between the first water pump mounting portion and the second water pump mounting portion, and may be disposed in the vertical direction with the first and second water pump mounting portion.

The sub connecting portion may be mounted at a position in the vicinity of the first water pump mounting portion between the main connecting portion and the first water pump mounting portion, and may be formed on the upper portion of the main body.

The sub connecting portion may be introduced the coolant from the shared reservoir tank to the first water pump mounting portion to prevent damage to the first water pump due to cavitation, when a flow direction of the coolant is changed by operation control of the coolant valve.

A chiller connecting portion formed at the main body to connect a chiller for exchanging heat between the coolant of the shared reservoir tank with a refrigerant may be further included.

The chiller connecting portion may be disposed at a position facing the main connecting portion in the main body, and may be disposed in a vertical direction with the first and second water pump mounting portion.

The valve mounting portion may be formed at a lower surface of the main body.

The main body, the water pump mounting portion, the valve mounting portion, and the chiller connecting portion may be integrally formed.

The chiller may be directly mounted to the chiller connecting portion.

According to a coolant supplying module according to an exemplary embodiment of the present invention, since the coolant is supplied from the shared reservoir tank to both the electrical component cooling circuit and the battery cooling circuit and various constituent elements are easily mounted, spatial utility of an engine compartment may be improved.

An exemplary coolant supplying module may directly mount the first and second water pumps for supplying the coolant to the electrical component cooling circuit and the battery cooling circuit and may be efficiently connected to connection pipes. Therefore, a layout of connection pipes may be simplified, and mountability and maintainability may be improved.

When the coolant valve is operated to change the flow path of the coolant, it is possible to prevent the first water pump 14 from being damaged due to cavitation by preventing an instantaneous lack of a coolant and a generating of an air bubbles.

Furthermore, required number of separate parts realizing the layout of the connection pipes may be minimized, decreasing weight and cost, and improving productivity by reducing required assembly processes.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

An exemplary embodiment of the present invention will hereinafter be described in detail with reference to the accompanying drawings.

Exemplary embodiments included in the exemplary embodiment and the constructions depicted in the drawings are only the exemplary embodiments of the present invention, and do not cover the entire scope of the present invention. Therefore, it will be understood that there may be various equivalents and variations at the time of the application of the present specification.

To clarify the present invention, portions that are not connected to the description will be omitted, and the same elements or equivalents are referred to with the same reference numerals throughout the specification.

Also, the size and thickness of each element are arbitrarily shown in the drawings, but the present invention is not necessarily limited thereto, and in the drawings, the thickness of layers, films, panels, regions, etc., are exaggerated for clarity.

Furthermore, unless explicitly described to the contrary, the word "comprise" and variations such as "comprises" or "comprising", will be understood to imply the inclusion of stated elements but not the exclusion of any other elements.

Furthermore, each of terms, such as " . . . unit", " . . . means", " . . . part", and " . . . member" described in the specification, mean a unit of a comprehensive element that performs at least one function or operation.

Figure 1:
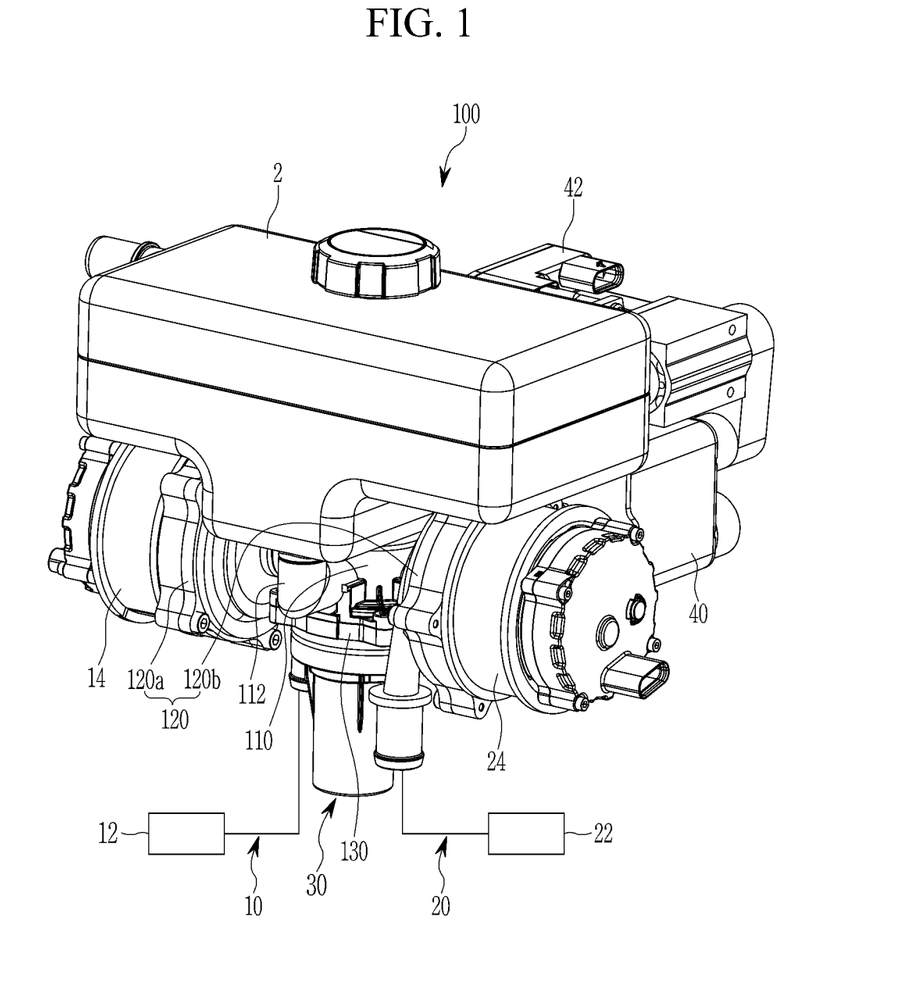
FIG. 1 is a perspective view of a coolant supplying module according to an exemplary embodiment of the present invention.
Figure 2:
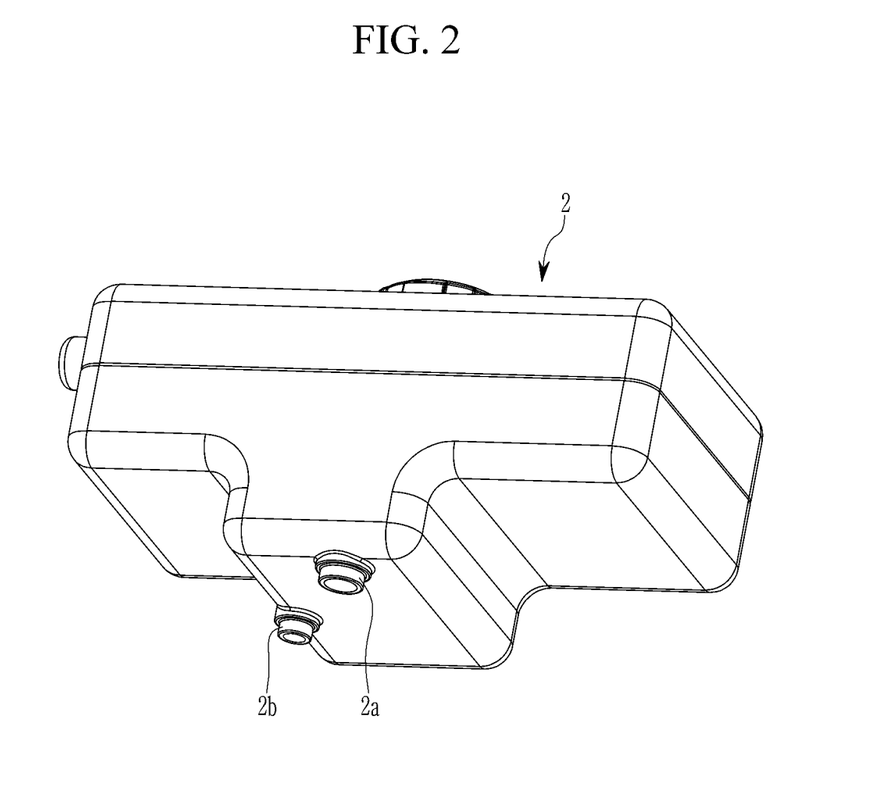
FIG. 2 is a perspective rear view of a reservoir tank mounted to a coolant supplying module according to an exemplary embodiment of the present invention.
Figure 3:
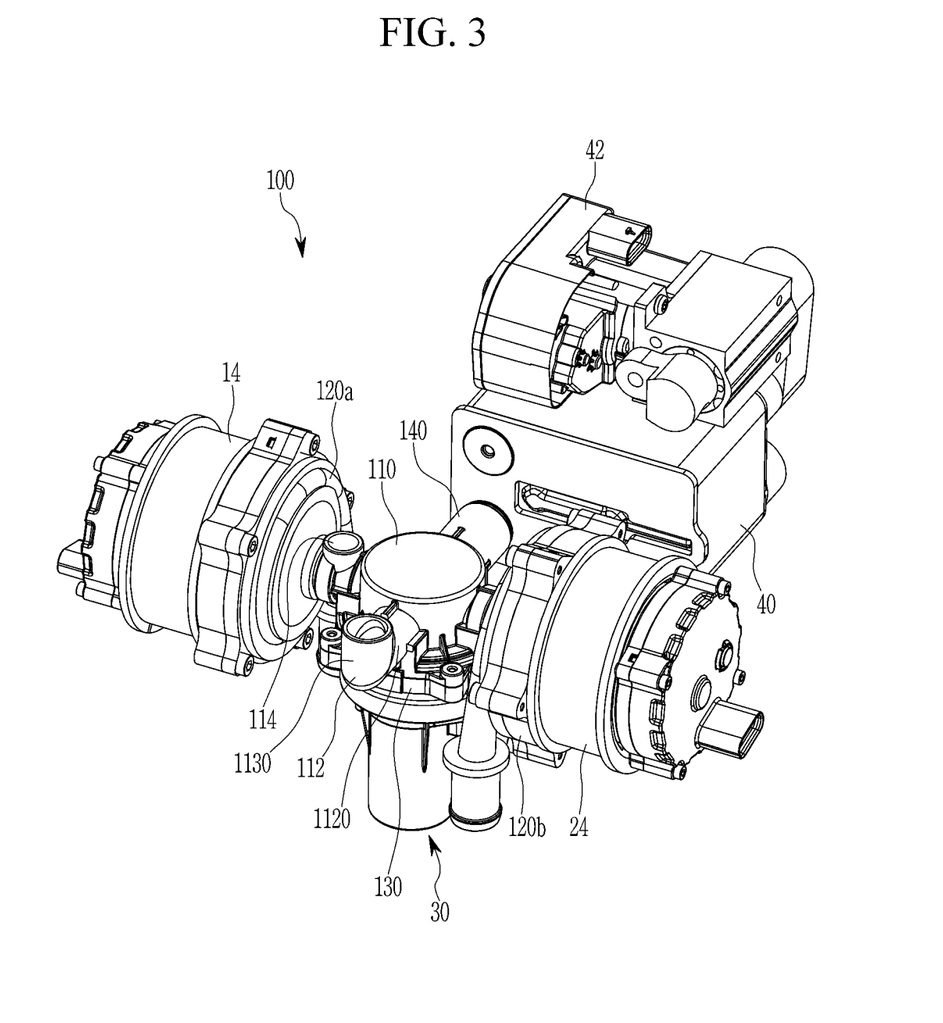
FIG. 3 is a perspective view of a main body mounted with constituent elements applied to a coolant supplying module according to an exemplary embodiment of the present invention.
Figure 4:
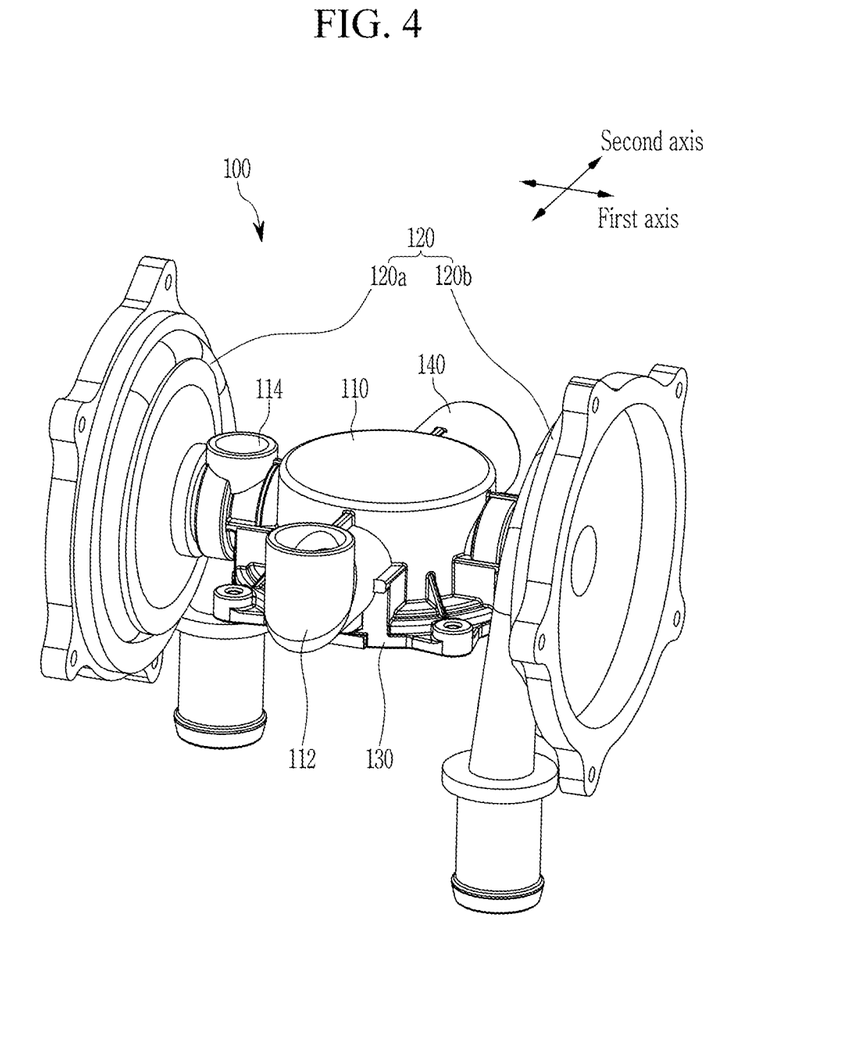
FIG. 4 is a perspective view of a main body applied to a coolant supplying module according to an exemplary embodiment of the present invention.
Figure 5:
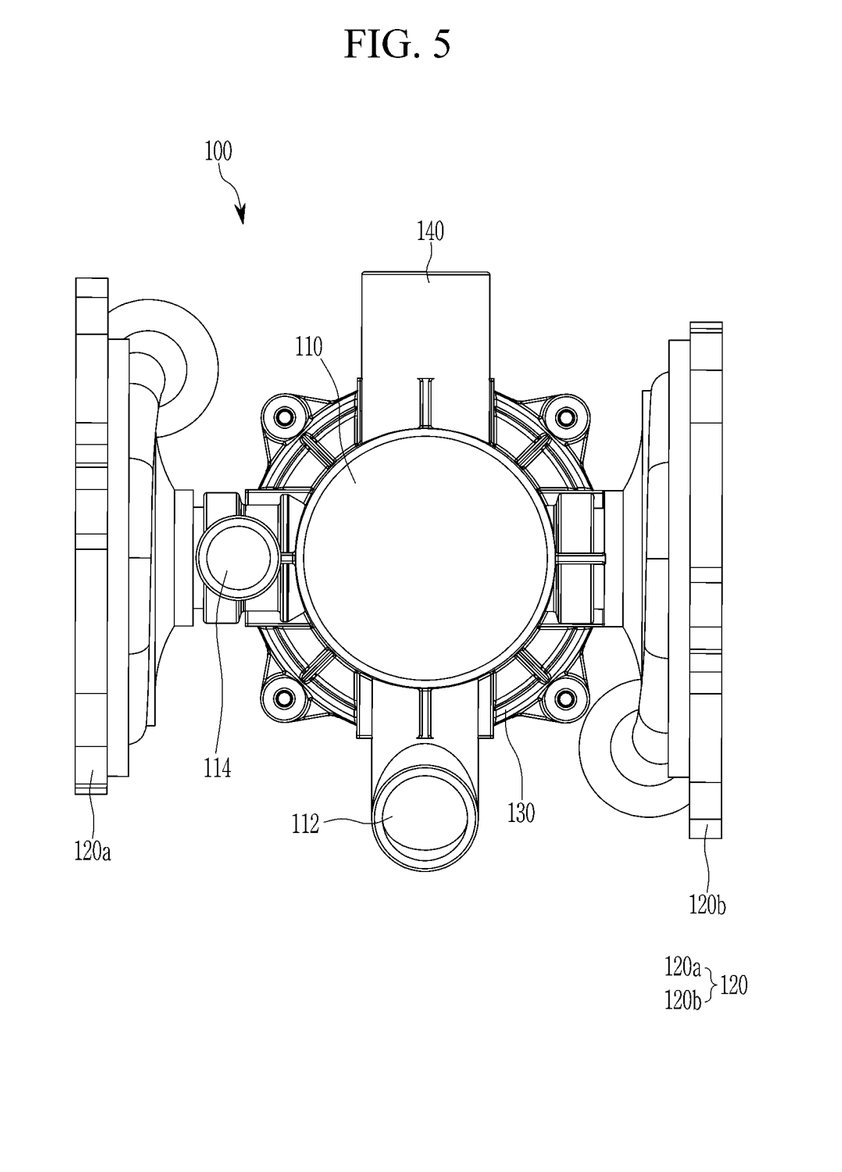
FIG. 5 is a plan view of a main body applied to a coolant supplying module according to an exemplary embodiment of the present invention.

FIG. 1 is a perspective view of a coolant supplying module according to an exemplary embodiment of the present invention, FIG. 2 is a perspective rear view of a reservoir tank mounted to a coolant supplying module according to an exemplary embodiment of the present invention, FIG. 3 is a perspective view of a main body mounted with constituent elements applied to a coolant supplying module according to an exemplary embodiment of the present invention, FIG. 4 is a perspective view of a main body applied to a coolant supplying module according to an exemplary embodiment of the present invention, and FIG. 5 is a plan view of a main body applied to a coolant supplying module according to an exemplary embodiment of the present invention.

Referring to the drawings, a coolant supplying module 100 according to an exemplary embodiment of the present invention may supply, a coolant stored in a shared reservoir tank 2 to an electrical component cooling circuit 10 for supplying a coolant to an electrical component 12, and the coolant to a battery cooling circuit 20 for supplying the coolant to a battery 22.

That is, the coolant supplying module 100 may supply the coolant stored in the shared reservoir tank 2 to both of the electrical component cooling circuit 10 and the battery cooling circuit 20.

As shown in FIG. 1 to FIG. 5, such a coolant supplying module 100 includes a main body 110, at least one water pump mounting portion 120, a valve mounting portion 130, and a chiller connecting portion 140.

Here, the main body 110, the at least one water pump mounting portion 120, the valve mounting portion 130, and the chiller connecting portion 140 may be integrally formed.

In the exemplary embodiment of the present invention, the main body 110 is formed in a cylindrical shape with an upper surface closed, and is connected to the shared reservoir tank 2 disposed at the top surface.

A space may be formed inside the main body 110 so that a coolant receives.

Here, a main connecting portion 112 and a sub connection portion 114 may be formed on the main body 110 to be connected to the shared reservoir tank 2.

One side end portion 1120 of the main connecting portion 112 is integrally connected to the main body 110. Another side end portion 1130 of the main connecting portion 112 may be perpendicularly bent toward the top surface of the main connecting portion 112 from the one side end portion of the main connecting portion 112.

Meanwhile, as shown in FIG. 2, a main discharge port 2a and a sub discharge port 2b may be formed at the bottom portion of the shared reservoir tank 2, respectively, in corresponding to the main connecting portion 112 and the sub connecting portion 114.

In the exemplary embodiment of the present invention, the at least one water pump mounting portion 120 may be formed at the main body 110 such that water pumps included in the electrical component cooling circuit 10 and the battery cooling circuit 20 may be mounted.

The at least one water pump mounting portion 120 may include first and second water pumps mounting portions 120a and 120b.

A first water pump 14 included in the electrical component cooling circuit 10 is mounted at the first water pump mounting portion 120a. The first water pump mounting portion 120a is formed at the main body 110.

A second water pump 24 included in the battery cooling circuit 20 is mounted at the second water pump mounting portion 120b. The second water pump mounting portion 120b is formed at the main body 110, at a different position from the first water pump mounting portion 120a.

The first water pump mounting portion 120a and the second water pump mounting portion 120b may be disposed to face each other on both sides of the main body 110, and may be positioned on the same line or on the same axis.

That is, by forming the first and second water pumps mounting portions 120a and 120b in horizontal directions, sizes and mounting locations of the first and second water pumps 14 and 24 may be optimized, and a layout of connection pipes for connection to the electrical component cooling circuit 10 and the battery cooling circuit 20 may also be optimized.

Here, the main connecting portion 112 may be formed on the main body 110 between the first water pump mounting portion 120a and the second water pump mounting portion 120b, and may be disposed in the vertical direction with the first and second water pump mounting portions 120a and 120b.

Furthermore, the sub connecting portion 114 may be disposed at a position in the vicinity of the first water pump mounting portion 120a between the main connecting portion 112 and the first water pump mounting portion 120a, and may be formed to protrude on the upper portion of the main body 110.

Accordingly, the shared reservoir tank 2 may be mounted to the main connecting portion 112 and the sub connecting portion 114 through the main discharge port 2a and sub discharge port 2b.

In the exemplary embodiment of the present invention, the valve mounting portion 130 is formed at the main body 110 such that a coolant valve 30 for changing flow path of the coolant circulating through the electrical component cooling circuit 10 and the battery cooling circuit 20 is mounted. Such a valve mounting portion 130 may be formed at a center portion of the lower surface of the main body 110.

Here, the sub connecting portion 114 may always introduced the coolant from the shared reservoir tank 2 to the first water pump mounting portion 120a to prevent damage to the first water pump 14 due to cavitation, when a flow direction of the coolant is changed by operation control of the coolant valve 30.

That is, when the first water pump 12 is operated regardless of the operation of the coolant valve 30, the sub connecting portion 114 may always flow the coolant stored in the shared reservoir tank 2 to the electrical component cooling circuit 10 through the main body 110 and the first water pump mounting portion 120a.

Accordingly, during the operation of the first water pump 14, the coolant is always supplied from the shared reservoir tank 2 through the sub connecting portion 114, preventing cavitation.

In the exemplary embodiment of the present invention, the chiller connecting portion 140 is formed at the main body 110, to connect a chiller 40 that heat-exchanges the coolant stored in the shared reservoir tank 2 with a refrigerant.

The chiller connecting portion 140 is disposed at a position facing the main connecting portion 112 in the main body 110. That is, the chiller connecting portion 140 may be disposed in the perpendicular direction with the first, and second water pump mounting portion 120a and 120b.

The chiller 40 may be directly mounted to the chiller connecting portion 140.

The chiller 40 may be a water-cooled heat-exchanger which is connected to an air-conditioning apparatus and exchanges heat between a coolant and a refrigerant.

The chiller 40 may be mounted with a refrigerant temperature sensor 42, and the like.

In an exemplary embodiment of the present invention, longitudinal axes of the main connecting portion 112, the sub connecting portion 114, and the main body 110 are in parallel to each other.

In an exemplary embodiment of the present invention, a first side end portion 1120 of the main connecting portion 112 is integrally connected to the main body 110 in a radial direction of the main body 110 and the second side end portion 1130 of the main connecting portion 112 is perpendicularly bent toward a top surface of the main connecting portion 112 from the first side end portion 1120 of the main connecting portion 112.

In an exemplary embodiment of the present invention, the first side end portion 1120 of the main connecting portion 112 and an axis formed by the first water mounting portion 120a and the second water mounting portion 120b are aligned to be perpendicular to each other.

In an exemplary embodiment of the present invention, the first side end portion 1120 of the main connecting portion 112 and the chiller connecting portion 140 are aligned in the same axis.

An operation of a coolant supplying module 100 according to an exemplary embodiment of the present invention is hereinafter described in detail.

Firstly, when separately cooling the electrical component 12 and the battery 22, the coolant valve 30 controls the flow direction of the coolant inside the main body 10 so that the electrical component cooling circuit 10 and the battery cooling circuit 20 are separated.

Accordingly, the coolant flowing from the shared reservoir tank 2 into the main body 110 through the main connecting portion 112 and the sub connecting portion 114 flows to the first water pump mounting portion 120a by the operation of the first water pump 14, and is supplied to the electrical component cooling circuit 10.

The coolant flowing into the main body 110 through the chiller connecting portion 140 after passing through the chiller 40 connected to the battery cooling circuit 20 flows to the second water pump mounting portion 120b by the operation of the second water pump 24, and may be circulated to the battery cooling circuit 20.

That is, when the electrical component 12 and the battery 22 are to be separately cooled, the electrical component cooling circuit 10 and the battery cooling circuit 20 are separated by the operation of the coolant valve 30 mounted at the coolant supplying module 100.

Accordingly, the coolant stored in the shared reservoir tank 2 may circulate the electrical component cooling circuit 10 to cool the electrical component 12, separately from the coolant flowing from the battery cooling circuit 20 into the main body 110.

Furthermore, the coolant of the battery cooling circuit 20 passes through the chiller 40 and then flows into the main body 110, separately from the coolant flowing from the shared reservoir tank 2 into the main body 110.

That is, the coolant of the battery cooling circuit 20 is cooled by a heat-exchange with a refrigerant supplied to the chiller 40 from the air-conditioning apparatus while passing through the chiller 40. The cooled coolant may flow into the main body 110 through the chiller connecting portion 140, thereafter being exhausted through the second water pump mounting portion 120b.

The coolant exhausted through the second water pump mounting portion 120b may circulate the battery cooling circuit 20 to cool the battery 22.

On the other hand, when integrally cooling the electrical component 12 and the battery 22, the coolant valve 30 operates to connect the electrical component cooling circuit 10 and the battery cooling circuit 20.

Accordingly, the coolant flowing into the main body 110 from the shared reservoir tank 2 through the main connecting portion 112, is flows to the second water pump mounting portion 120b by the operation of the second water pump 24, and is supplied to the battery cooling circuit 20.

That is, the coolant stored in the shared reservoir tank 2 is flowed into the main body 110 through the main connecting portion 112.

Accordingly, the coolant flowing into the main body 110 is exhausted through the second water pump mounting portion 120b, and may circulate the battery cooling circuit 20 to cool the battery 22.

Furthermore, the coolant flowing into the main body 110 from the shared reservoir tank 2 through the sub connecting portion 114 and the coolant flowing from the chiller connecting portion 140 into the main body 110 after passing through the battery cooling circuit 20 flow to the first water pump mounting portion 120a by the operation of the first water pump 13, and is supplied to the electrical component cooling circuit 10.

That is, the coolant flowing from the battery cooling circuit 20 into the main body 110 through the chiller connecting portion 140 flows from the chiller connecting portion 140 to the first water pump mounting portion 120a by the operation of the coolant valve 30. The coolant together with the coolant flowing into the sub connecting portion 114 may circulate the electrical component cooling circuit 10 to cool the electrical component 12.

In the present way, when integrally cooling the electrical component 12 and the battery 22, the electrical component cooling circuit 10 and the battery cooling circuit 20 may be connected to each other through the coolant supplying module 100 depending on the operation of the coolant valve 30.

As described above, according to a coolant supplying module 100 according to an exemplary embodiment of the present invention, depending on whether the electrical component 12 and the battery 22 is to be separately cooled or integrally cooled, e.g., according to a driving mode of a vehicle, the electrical component cooling circuit 10 and the battery cooling circuit 20 may be selectively connectable or separated in circulating the coolant.

Furthermore, a single reservoir tank 2 may be shared by the electrical component cooling circuit 10 and the battery cooling circuit 20.

According to a coolant supplying module 100 according to an exemplary embodiment of the present invention, since the coolant is supplied from the shared reservoir tank 2 to both the electrical component cooling circuit 10 and the battery cooling circuit 20 and various constituent elements are easily mounted, spatial utility of an engine compartment may be improved.

The exemplary coolant supplying module may directly mount the first and second water pumps 14 and 24 for supplying the coolant to the electrical component cooling circuit 10 and the battery cooling circuit 20 and may be efficiently connected to connection pipes. Therefore, a layout of connection pipes may be simplified, and mountability and maintainability may be improved.

In the main body 110, by preventing an instantaneous lack of the coolant supplied to the first water pump mounting portion 120a and a generating of an air bubbles, damage to the first water pump 14 due to cavitation may be prevented.

Furthermore, required number of separate portions realizing the layout of the connection pipes may be minimized, decreasing weight and cost, and improving productivity by reducing required assembly processes.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A coolant supplying module of supplying a coolant stored in a reservoir tank to an electrical component cooling circuit and a battery cooling circuit, the coolant supplying module comprising:
   a main body connected to the reservoir tank;
   at least a pump mounting portion formed at the main body, wherein at least a pump provided in the electrical component cooling circuit and the battery cooling circuit is mounted to the at least a pump mounting portion;
   a valve mounting portion formed at the main body, wherein a coolant valve for changing flow path of the coolant circulating through the electrical component cooling circuit and the battery cooling circuit is mounted to the valve mounting portion,
   wherein a main connecting portion and a sub connection portion are respectively formed on the main body to be fluidically-connected to the reservoir tank,
   wherein the at least a pump include a first pump and a second pump, and
   wherein the at least a pump mounting portion includes:
      a first pump mounting portion formed at a first side of the main body, wherein the first pump is provided in the electrical component cooling circuit and is mounted to the first pump mounting portion; and
      a second pump mounting portion formed at a second side of the main body, wherein the second pump is provided in the battery cooling circuit and is mounted to the second pump mounting portion; and
   a chiller connecting portion formed at the main body to connect a chiller for exchanging heat between the coolant of the reservoir tank with a refrigerant.

2. The coolant supplying module of claim 1,
   wherein a main discharge port and a sub discharge port are formed at a bottom portion of the reservoir tank, and
   wherein the main discharge port and the sub discharge port correspond to the main connecting portion and the sub connecting portion, respectively.

3. The coolant supplying module of claim 1, wherein the first pump mounting portion and the second pump mounting portion are mounted to face each other on the first side and the second side of the main body, and are disposed on a first axis.

4. The coolant supplying module of claim 1,
   wherein the main connecting portion is formed on the main body and positioned between the first pump mounting portion and the second pump mounting portion, and a second side end portion of the main connection portion is disposed in a perpendicular direction with respect to a second axis of the first and second pump mounting portions.

5. The coolant supplying module of claim 1, wherein longitudinal axes of the main connecting portion, the sub connecting portion, and the main body are in parallel to each other.

6. The coolant supplying module of claim 1, wherein the sub connecting portion is disposed in a vicinity of the first pump mounting portion between the main connecting portion and the first pump mounting portion, and is formed on an upper portion of the main body.

7. The coolant supplying module of claim 3, wherein a first side end portion of the main connecting portion is integrally connected to the main body in a radial direction of the main body and a second side end portion of the main connecting portion is perpendicularly bent toward a top surface of the main connecting portion from the first side end portion of the main connecting portion.

8. The coolant supplying module of claim 7, wherein the first side end portion of the main connecting portion and the first axis are aligned to be perpendicular to each other.

9. The coolant supplying module of claim 7, wherein the first side end portion of the main connecting portion and the chiller connecting portion are aligned in a second axis.

10. The coolant supplying module of claim 1, wherein the coolant is introduced into the sub connecting portion from the reservoir tank to the first pump mounting portion to prevent damage to the first pump due to cavitation, when a flow direction of the coolant is changed by operation control of the coolant valve.

11. The coolant supplying module of claim 1, wherein the chiller connecting portion is disposed to face the main connecting portion in the main body, and is disposed in a perpendicular direction with a longitudinal axis of the first pump mounting portion and the second pump mounting portion.

12. The coolant supplying module of claim 1, wherein the valve mounting portion is formed at a lower surface of the main body.

13. The coolant supplying module of claim 1, wherein the main body, the at least a pump mounting portion, the valve mounting portion, and the chiller connecting portion are integrally formed.

14. The coolant supplying module of claim 1, wherein the chiller is directly mounted to the chiller connecting portion.

15. The coolant supplying module of claim 1, wherein an upper end of the main body is closed, and the reservoir tank is mounted on the upper end of the main body.

* * * * *